United States Patent [19]

Triadu

[11] 4,359,168

[45] Nov. 16, 1982

[54] WOOD REINFORCED PLASTIC-SHEATHED MEMBERS, E.G. FOR BOXES

[75] Inventor: Alain Triadu, Levallois Perret, France

[73] Assignee: Allibert Exploitation, Societe Anonyme, Grenoble, France

[21] Appl. No.: 163,797

[22] Filed: Jun. 27, 1980

[30] Foreign Application Priority Data

Jun. 29, 1979 [FR] France ............................ 79 17420

[51] Int. Cl.³ ........................ B65D 6/00; B65D 6/34
[52] U.S. Cl. .................................... 220/73; 220/71; 220/83; 220/DIG. 14
[58] Field of Search ................. 220/71, 72, 73, 74, 220/83, DIG. 14

[56] References Cited

U.S. PATENT DOCUMENTS

| | | | |
|---|---|---|---|
| 2,676,729 | 4/1954 | Neville | 220/73 |
| 2,797,178 | 6/1957 | Noyes | 220/DIG. 14 |
| 3,286,876 | 11/1966 | Ring | 220/71 |
| 3,358,725 | 12/1967 | Bassard | 220/73 |
| 3,442,418 | 5/1969 | Stromberg | 220/71 |
| 3,455,483 | 7/1969 | Inkaar | 220/83 |

*Primary Examiner*—George E. Lowrance
*Attorney, Agent, or Firm*—Karl F. Ross

[57] ABSTRACT

A process for making synthetic resin structures in which the double wall element of a synthetic resin is molded with a channel open on one side of the element and into which a reinforcing body is fitted so that the walls of the channel flank this body. Each wall of the channel is provided with a row of openings, preferably extending in the longitudinal direction of the channel, the openings of each row registering with a respective groove formed in the reinforcement body. A cap or cover is molded over the open side of the channel so that portions of the synthetic resin of the cover can penetrate the openings and the grooves which can have a dovetail cross section.

5 Claims, 4 Drawing Figures

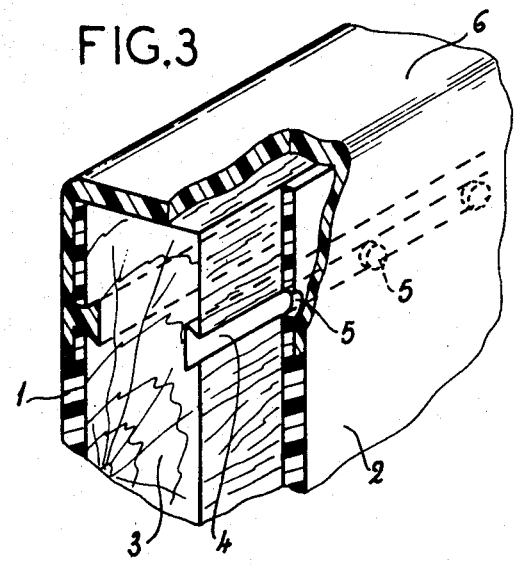
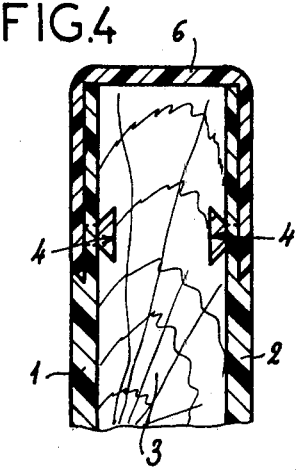
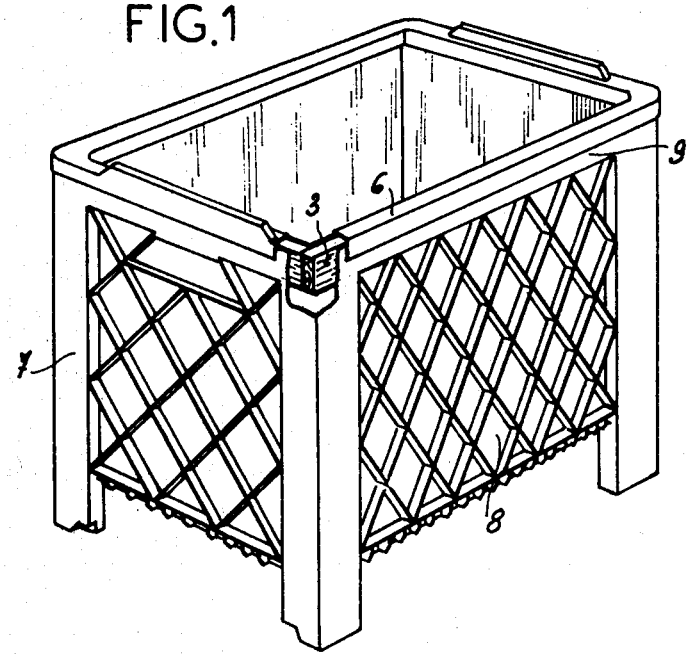
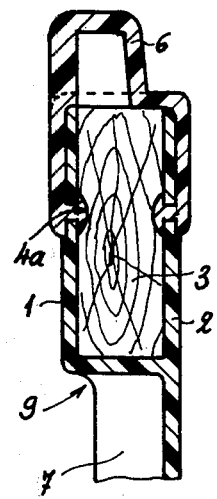

WOOD REINFORCED PLASTIC-SHEATHED MEMBERS, E.G. FOR BOXES

FIELD OF THE INVENTION

My present invention relates to a method of fabricating reinforced plastic articles and, more particularly, to strong and shock-resistant objects such as crates, boxes, palettes and the like, with armatures or reinforcements surrouned by synthetic resin materials (plastics) and to a method of making such objects.

BACKGROUND OF THE INVENTION

In the fabrication of objects of many types and for many purposes, it has long been recognized that most moldable synthetic resins, at least those of low cost, have insufficient rigidity, strength or shock resistance to be capable of withstanding rough handling. Thus, while it is desirable to be able to fabricate packing cases and other structures for the handling, storage and transportation of commercial and industrial articles and goods-transporting palettes by molding from synthetic resin materials it has also been recognized that, especially in the case of such large objects, the properties of the plastic are insufficient.

Thus where the objects have good rigidity, strength, flexural characteristics and resistance to compression, it has often been found that the materials were nevertheless unsatisfactory because of poor shock resistance. For example, when these handling boxes and palettes were dropped or caused to impact against some more rigid objects, they frequently suffered from cracking. Experience has shown that there are few if any economical plastics capable of being molded into large objects such as goods-handling crates and palettes, which at the same time provide effective rigidity and shock resistance.

Thus it has been proposed to reinforce molded synthetic resin articles with armatures, skeltons or like structures of high rigidity, the armatures being constituted, for example, of wood or metal.

While such composite systems overcome the lack of ability of the plastic alone to resist shocks the standard practice of molding the synthetic resin material all around the armature so that the armature is completely sheathed in the synthetic resin material has proved to be disadvantageous.

More particularly, even with the most delicate selection of the synthetic resin material to be molded around armatures it is found that cracking of the sheath occurs, presumably as a result of shrinkage of the synthetic resin during the cooling of the product after molding the synthetic resin around the armature. This cracking, of course, can weaken the product or can cause separation of the sheath from the armature to the detriment of the product.

OBJECTS OF THE INVENTION

It is the principal object of the present invention to provide an improved method of making or fabricating reinforced synthetic resin articles whereby the disadvantages of the prior-art systems are avoided, whereby the article can be fabricated economically and whereby the resulting product will have high strength, rigidity, and resistance to shock without creating a problem with respect to cracking of the plastic.

Another object of this invention is to provide an improved article of manufacture which avoids disadvantages of earlier devices of similar type.

SUMMARY OF THE INVENTION

These objects and others which will become apparent hereinafter are attained in accordance with the present invention by forming a synthetic resin member, also referred to as a double-wall member herein, with a channel open on one side of the member, the walls of this channel being each formed with a row of through-going openings in the longitudinal dimension of the channel.

The reinforcing member, i.e. a bar, which can have a cross section complementary to that of the channel, is received therein and is formed with respective lateral grooves which register with the respective openings of the two walls which flank this armature body.

According to the invention a synthetic resin is molded onto the assembly to close the channel and fill unitarily the openings or bores and the grooves of the reinforcement body aligned therewith. The cover or cap, which retains the rigid reinforcements, e.g. of wood or metal within the channel is locked to both walls of the channel and to the armature or reinforcement by penetration of the resin into and locking within the grooves of this latter body. These grooves may have a dovetail cross section.

According to a further feature of the invention, two rows of openings, i.e. bars, are coplanar and the two grooves lie in the same plane.

BRIEF DESCRIPTION OF THE DRAWING

The above and other objects, features or advantages of the present invention will become more readily apparent from the following description reference being made to the accompanying drawing in which:

FIG. 1 is a perspective view partly broken away of a portion of a box, crib or case in accordance with the principles of this invention;

FIG. 2 is a view drawn to a larger scale showing a portion of the assembly of FIG. 1 in section through an upper edge or case or box of FIG. 1;

FIG. 3 is a perspective view in somewhat larger scale, showing the interrelationship of the molded cap to the other elements; and FIG. 4 is a vertical section showing how a synthetic resin body can be reinforced in accordance with the invention.

SPECIFIC DESCRIPTION

As can be seen from FIGS. 3 and 4, a box, palette or other structure composed of the synthetic resin material can be reinforced to provide optimum strength, maximum resistance to shock and like advantages. To this end, the plastic members to be reinforced, usually of injection molded material, are provided with a pair of walls 1, 2 defining a channel between them and being parallel to one another. These walls may be molded unitarily with one another and the walls of the structure as can be seen in FIG. 2.

In the embodiment illustrated, the walls 1 and 2 extend upwardly so that the channel is also open upwardly.

After the object has been molded, the upper edges are reinforced by introducing an armature 3 composed of wood into the channel formed between the two walls 1 and 2.

This armature imparts rigidity, strength and shock resistance to the molded portion of the upper edge. The armature of each member thereof has two lateral faces which respectively confront the walls 1 and 2 and which are provided with two lateral longitudinal grooves which are undercut, e.g. made of dovetail cross sections as shown.

Each of the walls 1 and 2 is formed during molding or thereafter with a respective row of openings 5 and in the best mode embodiment of the invention, the rows of openings 5 and the grooves 4 are coplanar, the plane being perpendicular to the walls 1 and 2.

The pertinent connection of the assembly is effected by another piece of plastic material which is molded in place, has the configuration of an inverted U and forms a cap closing the open end of the channel and straddling the two walls 1 and 2 at least beyond the openings 5.

During the molding of the cap 6 onto the assembly 1, 2, 3, portions of the synthetic resin material pass through the openings 5 to fill the grooves 4 of the armature and connect the armature to the walls 1 and 2 and to the cover 6.

The molded piece 6 can be constituted of a plastic material which is highly resistant to shocks and which will not crack because of shrinkage or the like. The cover 6 is preferably a synthetic resin such as polypropylene which has a comparatively low cost. This material has many of the advantages of high density polyethylenes with greater strength and resistance to cracking. It also has good shock resistance. The walls 1, 2 and the walls of the box can likewise be molded from polypropylene.

The embodiment described is particularly suited for the production of boxes having vertical posts 7, lateral walls 8 and an upper edge 9, the latter being constituted by the double wall arrangement 1, 2 and having the cap 6 molded thereon.

While the double wall arrangement of FIGS. 3 and 4 is preferred, FIG. 2 shows that the lateral grooves of the armature (see element 4a) are able to have another profile.

The security of the connection of the element to one another resulting from the plugs of the material extending through the openings 5 and filling the grooves 4 is such that the assembly functions as if the reinforcing board had been molded in place and had been sheathed by the synthetic resin without introducing any danger of cracking.

I claim:

1. A reinforced synthetic resin object having at least one elongated member, said member comprising:
    a molded synthetic-resin channel having a pair of walls extending therealong and opening at one side of said member, each of said walls having a row of spaced apart through-going openings and having a thin section provided with said openings and a thick section adjacent said thin section;
    a reinforcement armature received in said channel and formed on opposite sides thereof with respective grooves of dovetail cross section, each registering with the openings of a row of a respective wall; and
    a synthetic resin cap molded on said thin sections of said walls and the open side of said channel while filling the openings and penetrating into said grooves, said cap being flush with said thick sections.

2. The object defined in claim 1 wherein said rows and said grooves are coplanar.

3. The object defined in claim 1 wherein said cap is composed of polypropylene.

4. The object defined in claim 3 wherein said openings are circular bores.

5. The object defined in claim 4 which is a goods handling box.

* * * * *